OR 3,632,182

X 3056E

United Stat

[11] 3,632,182

[72] Inventor Glenn T. Sincerbox
Wappingers Falls, N.Y.
[21] Appl. No. 16,835
[22] Filed Mar. 5, 1970
[45] Patented Jan. 4, 1972
[73] Assignee International Business Machines Corporation
Armonk, N.Y.
Continuation-in-part of application Ser. No. 719,880, Apr. 9, 1968, now abandoned. This application Mar. 5, 1970, Ser. No. 16,835

[54] METHOD AND APPARATUS FOR INTERFERENCE PATTERN RECORDING
19 Claims, 6 Drawing Figs.

[52] U.S. Cl. .......... 350/3.5, 356/172
[51] Int. Cl. .......... G02b 27/00
[50] Field of Search .......... 350/3.5; 96/162, 27 H; 340/5 H; 356/138, 172

[56] References Cited
UNITED STATES PATENTS
3,514,176 5/1970 Brooks et al. .......... 350/3.5
OTHER REFERENCES
De et al., Applied Physics Letters, Vol. 10, No. 3, Feb. 1967 pp. 78-79
Denisyuk, Optics & Spectroscopy, Vol. 18, No. 2, Feb. 1965 pp. 152-156

*Primary Examiner*—David Schonberg
*Assistant Examiner*—Ronald J. Stern
*Attorneys*—Hanifin and Jancin and John F. Osterndorf

ABSTRACT: Interference pattern recording is accomplished by simultaneous holographic and Lippmann holographic methods by directing the otherwise wasted radiation of the noninformation modulated beam back into the storage medium. Interference again takes place with the information-bearing beam to form another image in the medium. After processing the medium, reconstruction of the stored information is performed and a substantially stronger output image is generated.

INVENTOR
GLENN T. SINCERBOX

BY John F. Ostendorf

ATTORNEY

METHOD AND APPARATUS FOR INTERFERENCE PATTERN RECORDING

CROSS-REFERENCE TO RELATED APPLICATION

This application is a continuation-in-part of application Ser. No. 719,880 filed in the name of Glenn T. Sincerbox on Apr. 9, 1968, now abandoned.

BACKGROUND OF THE INVENTION

1. Field of the Invention

This invention relates to the recording of information in interference patterns and, more particularly, to the method and apparatus for recording and reading out information stored in patterns by the interference of radiation wave fronts.

2. Description of the Prior Art

Conventionally, information is stored in interference patterns according to the Lippmann, holographic, or Lippmann holographic methods. In the Lippmann method the establishment of an interference pattern is accomplished by employing a reflecting surface behind the storage medium. The interference pattern is established by forming nodes and antinodes at the locations of interference of the incident and reflected radiation waves in the storage medium. In the method of Lippmann holography the pattern is created by the interference of two beams of radiation acting on opposite sides of the storage medium; one of the beams being modulated with information. In holography the interference pattern is formed by the interference in the storage medium of a radiation wave modulated with information and a second or reference wave which is incident on the storage medium from the same side as the information-carrying wave.

According to the present state of the art of the holographic and Lippmann holographic forms of interference patterns storage, a substantial portion of the available energy present in the interrogation beam of radiation during readout of the stored information is undiffracted in the storage medium and passes directly through the medium as the zero order beam. This otherwise useful radiation is lost from the system. The low efficiency in the readout process provides a weak image of the stored information limiting the areas to which this form of recording can be applied.

SUMMARY

As contrasted with the prior art methods of recording and reading out information stored in interference patterns according to the holographic and Lippmann Holographic methods, this invention provides for the use of the otherwise wasted radiation during the recording process to enhance the image stored in the medium. During the readout process the undiffracted radiation or zero order beam is utilized to increase the efficiency of the reconstruction process to provide a substantially better image of the stored information.

According to one aspect of the invention, during the recording process, the portion of the radiation incident on the storage medium which is normally transmitted through the medium is directed back through the medium. The redirecting of this radiation takes place either from the opposite side or by utilizing suitable optical elements from the same side as the original incident beam. The formed interference patterns of the stored information are therefore a plurality of holograms or Lippmann holograms or a combination of both.

During the readout process, the interrogating beam is directed at the processed storage medium and the otherwise wasted undiffracted radiation passed through the storage medium is directed back into the storage medium. Each time this radiation is passed through the medium, a new image is generated which is concentric in size and spatial location with the original or first-generated image. Dependent upon the location of the observer and the location of the original interrogating beam and the manner in which the radiation is redirected back into the storage medium, the image is made up of virtual images or real images, or a combination of both.

In accordance with another aspect of the invention, the methods and apparatus described in this invention have application as a registration indicator.

DESCRIPTION OF THE PREFERRED EMBODIMENTS

Figure 1:
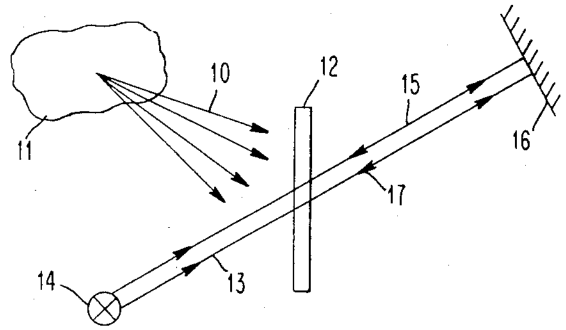
FIG. 1 is a schematic diagram illustrating one arrangement for accomplishing the storage of information according to the method of the invention.

In FIG. 1, diffracted radiation wave front 10 from an object 11 is directed at a suitable recording medium, such as photographic emulsion 12. At the same time radiation wave front 13 from a reference source 14 is also directed at emulsion 12. In each instance the wave fronts or beams 10 and 13 may be provided by any suitable source of electromagnetic radiation. For purposes of this description, it is assumed that the beams are provided by light sources such as lasers.

As thus described, beams 10 and 13 interfere on the same side of emulsion 12. The interference of beams 10 and 13 creates an interference pattern in emulsion 12. The pattern formed in emulsion 12 is one of bright and dark areas indicative of the stored information. This is the conventional method of holographic recording in a photographic emulsion.

The light in beam 13 incident on emulsion 12 interferes with the information modulated light in wave front 10. However, all of the light is not absorbed in the emulsion and a substantial portion of it passes through the emulsion as beam 15. If the intensity and amplitude of beam 13 are I and A, respectively, it has been determined that the intensity and amplitude of beam 15 approximate 0.5I and 0.7A. In the conventional holographic process this light is lost from the system.

A mirror 16 is positioned on the opposite side of emulsion 12 from the location of radiation source 14. Mirror 16 is positioned in the path of the beam 15 passed by emulsion 12. It is positioned on the same axis as the axis of incident beam 13. Beam 15 is reflected by mirror 16 so as to be redirected in the direction of arrows 17 back into emulsion 12 for interference with beam 10 carrying the information from object 11. A second interference pattern is formed in emulsion 12 at the location of interference of the two beams. This pattern is formed according to the Lippmann halographic method of recording. The object 11 is thus re-recorded in emulsion 12.

As will be apparent from the description which follows hereinafter, it is not necessary that the first pattern that is formed in emulsion 12 be formed according to holographic techniques and the second according to Lippmann holographic techniques. Reference source 14 could be positioned at the location of mirror 16, and mirror 16 at the location of reference source 14. In this manner the process would be reversed such that a Lippmann hologram would be first formed in emulsion 12 and an ordinary hologram would form a second pattern in emulsion 12. In like manner the otherwise wasted light in beam 15 could be directed by suitable optical elements so that it is incident on emulsion 12 from the same side each time it is directed at the emulsion.

Figure 2:
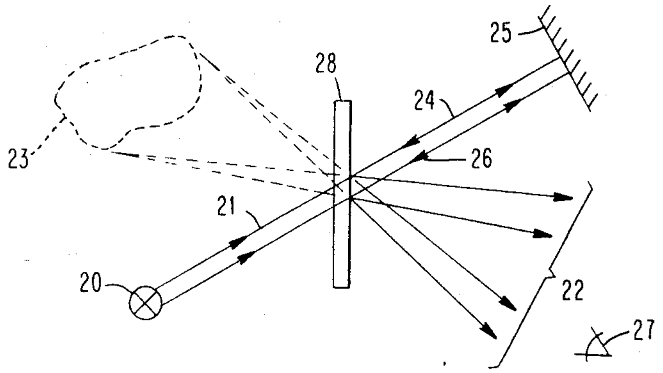
FIG. 2 is a schematic diagram illustrating one arrangement for accomplishing the readout of the information stored according to the recording method of FIG. 1.

Referring now to FIG. 2, photographic emulsion 12 is processed and developed according to conventional photographic techniques to form a hologram 28 which is positioned in the same location for readout of the stored interference patterns as utilized for recording. An interrogating radiation source 20 directs an interrogating beam 21 at hologram 28 along the same axis as the reference beam 13 in the recording process of FIG. 1. Beam 21 is incident on hologram 28 and light rays 22 are diffracted, forming a holographic virtual image. A virtual image is one that appears to be coming from behind the hologram in space, as indicated at 23.

A substantial part of beam 21 which is incident on hologram 28 is not diffracted at the hologram but passes through it as the zero order beam 24. Beam 24 contains no information but is attenuated due to the passage through hologram 28. If the intensity and amplitude of interrogating beam 21 are I and A, respectively, then the intensity of beam 24 approximates 0.25I and the amplitude 0.5A.

Mirror 25 is positioned in the same location as mirror 16 employed in the recording process of FIG. 1. The otherwise wasted light of the zero order beam is redirected back into hologram 28 by mirror 25 in the direction of arrows 26. Light is again diffracted as rays 22 in the form of a Lippmann holographic virtual image. This image again appears in space, as indicated at 23, as being behind hologram 28. It is concentric in size with the holographic virtual image and has the same spatial location as the holographic virtual image.

There is thus provided a substantially enhanced image at 23 on the readout of the stored information. The efficiency of the reconstruction of the information stored in interference patterns is substantially increased. The virtual images which appear at 23 could be made to appear on a screen at the location of an observer 27 if the diffracted light rays 22 were first passed through a lens.

Figure 3:
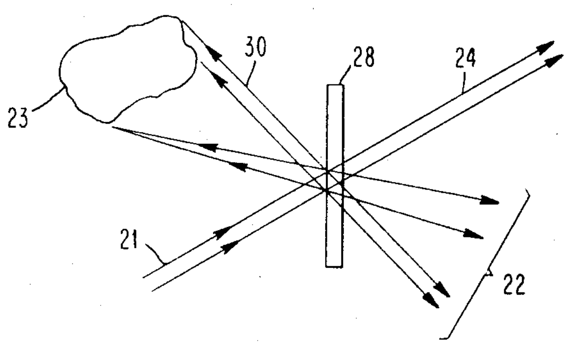
FIGS. 3 and 4 are schematic diagrams illustrating the generation of separate images according to the readout method of FIG. 2.
Figure 4:
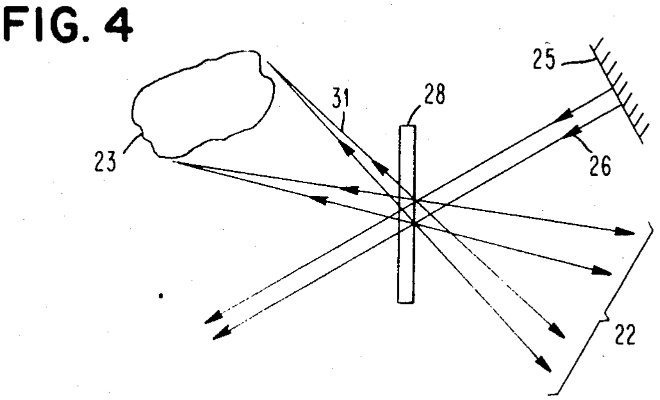

FIGS. 3 and 4 illustrate the two aspects of the readout process of FIG. 2. The holographic virtual image 23 is provided in FIG. 3 when beam 21 is incident on hologram 28. Diffracted light 22 provides this virtual image. The undiffracted light passes as beam 24 through hologram 28.

In FIG. 4, mirror 25 reflects beam 24 in the direction of arrows 26 to hologram 28. Diffracted light 22 provides the Lippmann holographic virtual image at 23. Both reconstructed images are concentric in size, having the same spatial location and are superimposed. The resulting efficiency of the output image is greater than that provided by either the holographic technique or the Lippmann holographic technique above. This method of information storage and retrieval provides at least a 50 percent increase in the efficiency of the image reconstruction process.

As shown in FIGS. 3 and 4, real images are also obtained in addition to the virtual images in the interrogating process. In FIG. 3, a Lippmann holographic real image is obtained. Light 30 is reflected from hologram 28 to generate this Lippmann holographic real image at 23. Similarly, in FIG. 4 the generation of the Lippmann holographic virtual image by the the diffracted light 22 also results in the formation of a holographic real image at 23 by the diffraction of light 31. Contrary to the formation of real images in the conventional holographic and Lippmann holographic processes, hologram 28 is located in the same position and with the same orientation as in the recording process. The resulting images are formed in the same location as the original object of the recording process of FIG. 1. In the normal real image formation process the hologram must be displaced 180° from the position of the emulsion during recording. The image forms on the opposite side of the hologram from the original object. Since the resulting real image is formed at the location of the original object, comparison may be effected with the object and any mismatch used to indicate translational misregistration. Registration is then accomplished by translating the plate until the image and the object coincide.

Such a registration technique may be included as part of an interference pattern storage system and be an integral part of the storage medium. If the information is stored by this technique, then the reconstruction from any block of information in a multiblock storage medium serves as the registration indicator. Such a technique also has application for the registration of visual display plates, art work generation plates and monolithic semiconductor circuit devices.

The storage and readout method functions for registration indication due to the two processes by which the reconstruction is accomplished. Although there is an intensity change, the reconstructed image formed according to holography does not move or shift as the hologram is rotated about any axis in the film plane. The reconstructed image formed by the Lippmann holography method, that is by the reflection of the zero order beam, moves as the hologram is rotated. By adjusting the hologram until the two reconstructed images coincide, angular registration of the hologram is accomplished.

The real images formed by the light 30 (FIG. 3) and 31 (FIG. 4) also have application in interference pattern storage systems. Since the necessity for inverting the hologram is eliminated, repositioning of the hologram is simplified. Real image formation according to the conventional holographic process requires the inversion of the curvature of the illuminating or interrogating beam as compared to the original reference beam curvature of the recording process. According to the methods of this invention, this is no longer required. The detector bank may also be located at the original information area location.

As described above for FIGS. 1 to 4, the recording process has involved the formation of an interference pattern by holographic methods followed by the formation of a second interference pattern by Lippmann holographic methods or vice versa. In each instance the reference beam employed for the formation of the second interference pattern has followed the same axis as the original incident reference beam used in forming the first interference pattern. Modification of these techniques is also possible.

Figure 5:
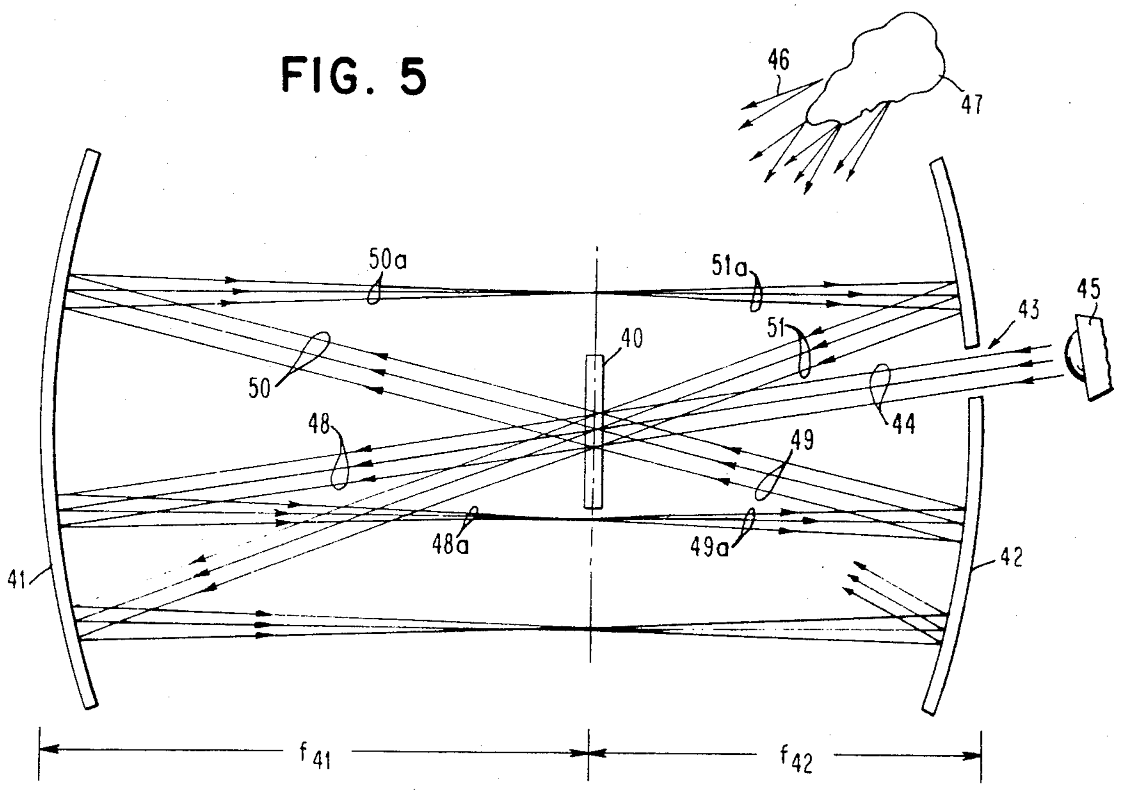
FIG. 5 is a schematic diagram of another apparatus for accomplishing the storage of information according to the method of the invention.

In FIG. 5 apparatus is shown for directing a substantially collimated reference beam during the recording process back around the photographic emulsion for at least one more additional illumination of the same area of the emulsion, each reference beam illumination occurring at a slightly different angle with respect to the others. Each time the reference beam is redirected into the emulsion it enters the same face or side of the emulsion for interaction with the same signal beam generating another interference pattern in the same volume of the emulsion.

Emulsion 40 is positioned between spherical mirrors 41 and 42. Mirrors 41 and 42 have slightly different focal lengths $f41$ and $f42$ and are situated so that their focal planes coincide with each other and with emulsion 40. Mirror 42 is provided with an aperture 43 through which a substantially collimated reference light beam 44 is transmitted from coherent source 45. At the same time diffracted light 46 which is derived by suitable optical means from the same source of coherent light is provided from object 47. Light 46 is the information bearing beam and is incident on photographic emulsion 40. Beam 44 interferes with beam 46 to form a first interference pattern.

The nonabsorbed light of the reference beam is transmitted through emulsion 40 as beam 48 and is reflected by mirrors 41. Beam 48 is reflected and focused by mirror 41 for converging as beam **48*a* to come to a focus in the plane of emulsion 40 outside the region of the emulsion. It then diverges as beam 49*a*. Mirror 42 reflects beam 49*a* for reentry into emulsion 40 as a substantially collimated beam 49 for interference with beam 46. The nonabsorbed light from beam 49 is transmitted through emulsion 40 as beam 50 for reflection by mirror 41. Beam 50 is reflected and focused by mirror 41 and converges as beam 50*a* coming to a focus in the plane of emulsion 40 outside the region of the emulsion. Beam 51*a* diverges from this focus toward mirror 42 to be provided as substantially collimated beam 51 for interference with beam 46 in the same are of emulsion 40**.

This process is continued with the reference beam being redirected around emulsion 40 for successive entry as a substantially collimated beam into emulsion 40 to form a new interference pattern with the signal beam 46 each time it is incident on the emulsion. Each time the reference beam enters the emulsion, it enters from the same side of the emulsion. The angle of incidence of the reference beam is slightly different on each passage through the emulsion. The difference in angle of incidence is determined by the difference in focal lengths between mirrors 41, 42.

The number of times that the redirection of the reference beam through the emulsion may be accomplished depends on the angular resolution of the emulsion, the coherence length of the radiation beam and the complexity of the mirror system required. The more equal the focal lengths of the mirrors the more passes that can occur through the emulsion. As is readily apparent, the total path length traveled by the reference beam cannot exceed the coherence length of the radiation beam.

As shown in FIG. 5, each successive time the return beam 48*a*, *50a* diverges from mirror 41 it comes to a focus in the plane of the emulsion at a location further removed from the emulsion than the preceding time. Thus, this arrangement is self-limiting in the number of passes that may be made through emulsion 40 before the reference beam is directed outside the optical arrangement of mirrors. This arrangement may be modified. Thus, instead of passing reference beam 44 through aperture 43 in mirror 42, it could be initially brought into the optical arrangement from a location above mirror 41. An aperture is not required in mirror 41. All of the directions shown for the reference beam in FIg. 5 would be reversed. The reference beam would continue to come to a focus in the plane of emulsion 40. However, after each successive pass through emulsion 40, the beam would come to a focus closer to the emulsion than the preceding time. A stop would be provided for the beam after a fixed number of passes by the reference beam for absorbing the remaining light of the reference beam or for ejecting it from the optical arrangement.

After processing the photographic emulsion, the formed hologram is placed in the optical system in the same location as that of the emulsion during the recording process. An interrogating beam is positioned in the same location as source 45 and is directed through the processed emulsion along the same path as traversed by the reference beam in the recording process. The nondiffracted light on each passage through the hologram is reflected by the mirror arrangement for reentry back through the hologram. As only ordinary holograms have been stored in the photographic emulsion, virtual images of the holographic type are formed at the location 47 of the original object object. Each successive virtual image is superimposed on the preceding one, providing substantially greater image reconstruction efficiency.

If the signal beam 46 is moved to the other side of the photographic emulsion 40 or if the reference source is positioned on the other side of the emulsion 40 during the recording process, all Lippmann holographic virtual images are provided on readout at the location of the signal source. If the holographic plate is inverted in position or if the interrogating beam directions are inverted after recording as described for the system of FIG. 5, holographic real images only are provided at the location of the original object 47.

Figure 6:
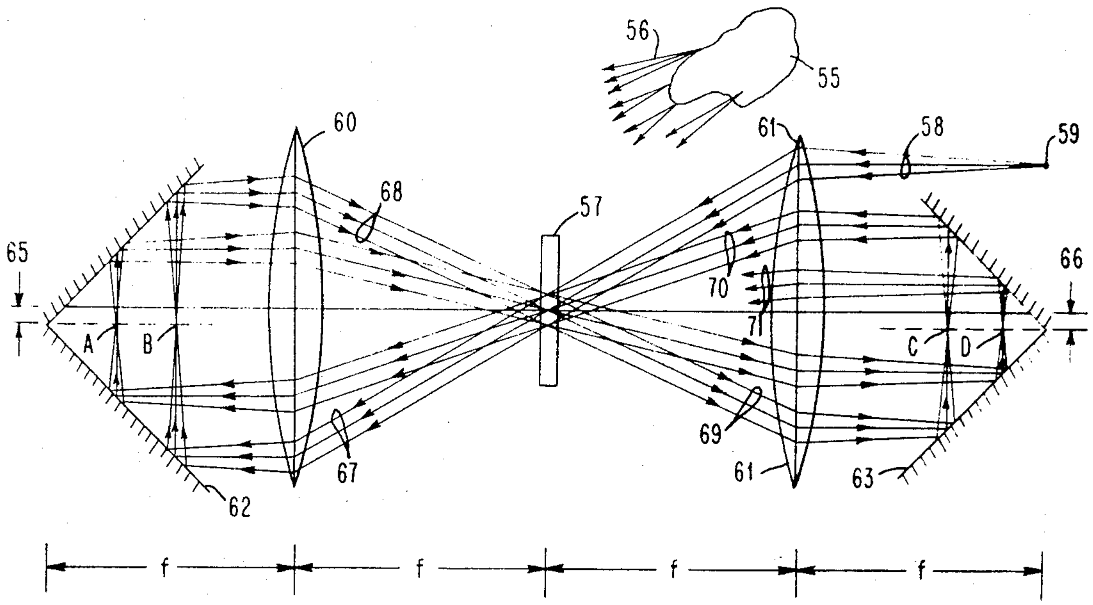
FIG. 6 is a schematic diagram of a further apparatus for accomplishing the storage of information according to the method of the invention.

A further modification of the method and apparatus of this invention provides for the combination of these techniques to permit a multiplicity of ordinary holograms to be formed with a multiplicity of Lippmann holograms. In FIG. 6 the object to be recorded is positioned at 55. Diffracted light from object 55 is formed in information-bearing beam 56 and is directed at photographic emulsion 57. Coherent reference beam 58 is provided by source 59 which also provides the light for diffraction at object 55. Beam 58 is a diverging beam of light contained within a small cone angle as could be obtained from a laser beam by means of a long focal length lens. Source 59 represents the focal point of that lens (not shown). Such a light source minimizes any light losses in the system.

Lenses 60 and 61 combine with plane mirrors or rooftop prisms 62, 63, respectively, for directing that portion of the reference beam transmitted through the emulsion back through the emulsion from the same side as it exited. The mirrors or prisms 62, 63 are axially displaced from the optic axis of the system as shown at 65, 66 to provide axial displacement for separating the feedback beams.

Source 59 is in the focal plane of lens 61. The light focused by lenses 60 and 61 at points A, B, C and D fall in the plane determined by the apices of mirrors 62 and 63. The distances to lens 60 to focal point A is the same as the distance from point A in the opposite direction back to lens 60. Thus, the plane determined by the mirror apices is the locus of points equidistant from the lens via either path. It is also noted that the apex of each mirror 62, 63 also falls in the focal plane of lenses 60, 61.

In recording, beam 56 interferes at emulsion 57 with reference beam 58 which is collimated at emulsion 57 by lens 61. That portion of reference beam 58 which is transmitted through emulsion 57 passes as beam 67 through lens 60. After reflection at mirror 62, beam 67 comes to a focus at point B. It is then provided as a second reference beam 68 to form a Lippmann hologram with signal beam 56. That portion of beam 68 which is transmitted through emulsion 57 becomes beam 69 which is reflected by mirror surface 63 to a focus at point C. After again being reflected at mirror 63 beam 69 is collimated by lens 61 for reentry as beam 70 to form a second ordinary hologram with signal beam 56 in emulsion 57.

In the same manner as described with respect to FIG. 5, this process may be repeated for a number of times dependent on the angular resolution of the emulsion, the coherence length of the beam of radiation and the complexity of the optical system. The number of passes the reference beam makes through the emulsion is determined by the separation of the apices of the mirrors from the optical axis of the lenses, that is, the distances 65 and 66. If these distances are reduced the number of passes of the reference beam through the emulsion is increased. As each succeeding path traveled by the reference beam brings it closer to the optical axis of lenses 60 and 61, a stop is required such as in the path of beam 71 to block the passage of the beam to the emulsion by absorbing the light or by deflecting it from the optical arrangement. The total path traversed by the reference beam cannot exceed the coherence length of the light source.

After processing the photographic emulsion 57, the formed hologram is positioned in the same location as the photographic emulsion for readout. The interrogating beam would also be substantially collimated and as provided initially from the same location as the source 59 of the reference beam would follow substantially the same path as traversed by the reference beam in the recording process. A plurality of superimposed virtual images is provided at the location of the object 55. These virtual images will be a combination of holographic virtual images and Lippmann holographic virtual images.

It is readily apparent that with the apparatus of this invention the efficiency of readout of the recorded interference patterns is substantially increased. Greater efficiency in the utilization of the interrogating beam is accomplished, permitting greater application of the techniques of interference pattern recording. The photographic emulsions employed in the method and apparatus of this invention are conventional in nature. One such emulsion which may be utilized is that available as Eastman Kodak Type 649-F plates. Such an emulsion provides high resolution in recording the interference pattern.

Although the invention has been described as utilizing light waves of the visible spectrum, it is to be understood that the invention is not so limited but is applicable to the formation of interference patterns using wave fronts of electromagnetic energy outside this portion of the spectrum provided they have a transverse wave front pattern.

A measure of the increase in efficiency of the process of this application may be obtained from the following figures. Either conventional holography or Lippmann holography is about 4 percent efficient. If both processes are performed but not simultaneously, the efficiency of the process decreases and approximates 3 percent. When two holograms or Lippmann holograms are formed by the process described in relation to FIG. 1 of this application, efficiency increases to about 6.5 percent with a possible limit of 16 percent.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. In a recording method, wherein information is recorded in a storage medium as interference patterns, a pattern resulting from the interference in the medium of an information-bearing wave front of radiation with part of the radiation from a reference wave front coherent with the information-bearing wave front the remaining part of the reference wave front being transmitted through the medium, the information and reference radiation wave fronts following axes angularly displaced from each other at the storage medium, the step comprising forming sequentially at least one additional interference pattern in the same portion of the storage medium as the formed pattern by redirecting by a reflecting surface substantially all of the reference wave front of radiation transmitted through the storage medium back into the storage medium for interference with the same information-bearing wave front of r radiation the normal to the effective portion of the reflecting surface and the normal to the surface of the storage medium being angularly displaced from each other.

2. In the method of claim 1, wherein one additional pattern is formed by redirecting the transmitted reference wave front back to the medium on the same axis as the original axis of incidence of the reference wave front and with the redirected wave front being incident on the side of the medium opposite to the side of incidence of the original reference wave front.

3. In the method of claim 1, wherein one additional pattern is formed by redirecting the transmitted reference wave front back to the medium for incidence on the same side of the medium as the original reference wave front but at a different angle of incidence from that of the original reference wave front.

4. In a recording method, wherein information is recorded in a storage medium as interference patterns, a pattern resulting from the interference in a storage medium of an information-bearing wave front of radiation with a reference wave front of radiation coherent with the information-bearing wave front, the information and reference radiation wave fronts following axes angularly displaced from each other at the storage medium, the step comprising forming in sequence a plurality of interference patterns all in the same portion of the storage medium with the reference wave front used in forming each pattern after the initial one being obtained by redirecting by a reflecting surface at least a portion of the reference radiation wave front transmitted through the storage medium in forming the preceding pattern back into the storage medium for interference with the same information-bearing wave front the normal to the effective portion of the reflecting surface and the normal to the surface of the storage medium being angularly displaced from each other.

5. In the recording method of claim 4, wherein the redirected reference wave fronts are all incident on the same side of the storage medium.

6. In the recording method of claim 5, wherein the reference wave fronts used in forming the plural patterns are all incident on the same side of the storage medium as the information-bearing wave fronts whereby a plurality of holographic interference patterns are formed.

7. In the recording method of claim 5, wherein the reference wave fronts used in forming the plural patterns are all incident on the opposite side of the storage medium from the information-bearing wave front whereby a plurality of Lippmann holographic interference patterns are formed.

8. In the recording method of claim 4, wherein the redirected reference wave fronts are alternately incident on one side of the storage medium and then on the other, whereby the formed interference patterns are of the holographic and Lippmann holographic types.

9. In an information retrieval method, wherein information is recorded as interference patterns in a storage medium by the interferences of information-bearing and reference wave fronts of radiation, the step comprising interrogating the storage medium having formed interference patterns therein by directing a wave front of radiation at the portion of the medium containing the patterns with the diffracted part of the radiation forming an image of the stored information and thereafter redirecting by a reflecting surface substantially all of the nondiffracted portion of the interrogating wave front back to the storage medium to reinterrogate the same portion of the medium to reinforce substantially the formed image the normal to the effective portion of the reflecting surface and the normal to the surface of the storage medium being angularly displaced from each other, the interrogating wave front of radiation following the same path as traveled by the reference wave front in forming said patterns.

10. In the method of claim 9, wherein the recording of information as interference patterns in a storage medium results for each pattern from the interference in the medium of an information bearing wave front of radiation with a reference wave front of radiation and with the reference wave front for forming each pattern after the initial one being obtained by redirecting the reference radiation wave front transmitted through the medium in forming the preceding pattern back into the medium, the interrogation of the storage medium occurring by directing the wave front of radiation along the same path followed by the reference beam in recording the patterns.

11. In an information retrieval method, wherein information is recorded as interference patterns, each pattern resulting from the interference in a storage medium of an information-bearing wave front of radiation with a reference wave front of radiation and with the reference wave front for forming each pattern after the initial one being obtained by redirecting by a reflecting surface the reference radiation wave front transmitted through the storage medium in forming the preceding pattern back into the medium the normal to the effective portion of the reflecting surface and the normal to the surface of the storage medium being angularly displaced from each other, the step comprising interrogating the storage medium having formed interference patterns therein by directing a wave front of radiation at the portion of the medium containing the patterns along the same directional axis as the reference wave front used in recording the patterns and thereafter redirecting substantially all of the nondiffracted portion of the interrogating wave front sequentially back to the storage medium along substantially the path followed by the reference wave front in recording the patterns, so that each such time that the interrogating wave front traverses the medium an image is generated of the information contained in the information-bearing wave front used in recording the patterns, each such subsequent image being the same as and being superimposed on the ones generated preceding it.

12. In the method of information storage and retrieval wherein information is recorded in a storage medium as interference patterns of plural wave fronts of radiation, the steps comprising forming sequentially a plurality of patterns in the medium by the interference of an information-bearing wave front of radiation with a reference wave front of radiation and with the reference wave front for forming each pattern after the initial one being obtained by redirecting by a reflecting surface substantially all of the radiation wave front transmitted through the medium in forming the preceding pattern back into the medium for interference with the same wavefront wave front the normal to the effective portion of the reflecting surface and the normal to the surface of the storage medium being angularly displaced from each other, the information-bearing and reference wave fronts following axes angularly displaced from each other at the storage medium, and interrogating the medium having formed interference patterns therein after processing the medium by directing a wave front of radiation at the patterns along substantially the same path traveled by the reference wave front in forming said patterns a plurality of times equal to the number of stored patterns, the diffracted part of the radiation in each interrogation forming an image of the stored patterns and substantially all of the nondiffracted part of the radiation after each interrogation being directed back to the medium for the next subsequent interrogation.

13. Information storage apparatus, comprising a storage medium, means for directing an information-bearing wave front of radiation at the medium, means for directing a reference wave front of radiation coherent with the information-bearing wave front for interference at the medium with the information-bearing wave front to generate an interference pattern in the medium containing the information, a portion of the reference wave front being transmitted through the medium, and means for redirecting substantially all of the transmitted portion of the reference wave front back to the medium as a new reference wave front at least once for interference with the same information-bearing wave front, the normal to the effective portion of the redirecting means and the normal to the surface of the storage medium being angularly displaced from one another, each such time the new reference wave front interferes with the information-bearing wave front a new pattern being generated in the medium.

14. The apparatus of claim 13, wherein the redirecting means comprises reflective means positioned on the same axis as the axis of the reference wave front and on the opposite side of the medium from the location of origin of the reference wave front.

15. The apparatus of claim 13, wherein the redirecting means comprises first and second reflective means disposed on opposite sides of the medium for redirecting the transmitted portion of the references wave front back to the medium for effecting a plurality of sequential interferences with the information-bearing wave front in the medium.

16. Apparatus for accomplishing the retrieval of information stored as interference patterns by the interference of an information-bearing wave front of radiation with a reference wave front of radiation coherent with the information-bearing wave front and with the reference wave front for forming each pattern after the initial one being obtained by redirecting the noninterfering portion of the reference wave front from the formation of the preceding pattern back to interfere with the information-bearing wave front comprising a storage medium having formed interference patterns therein, means for directing an interrogating wave front of radiation at the medium, so that a portion of the interrogating wave front is diffracted generating an image of the stored information, the remaining portion of the interrogating wave front being undiffracted and transmitted through the medium, and means for sequentially redirecting substantially all of the transmitted portion of the interrogating wave front back to the medium as a new interrogating wave front at least once to reinterrogate the medium by reconstructing another image of the stored information which reinforces the generated image, the normal to the effective portion of the redirecting means and the normal to the surface of the storage medium being angularly displaced from one another; the interrogating wave front following substantially the same path for each interrogation as the reference wave front in forming said patterns.

17. The apparatus of claim 16, wherein the redirecting means comprises reflective means positioned on the same axis as the axis of the interrogating wave front and on the opposite side of the medium from the location of origin of the interrogating wave front, the interrogating wave front originating at the same location as the location of the reference wave front utilized in storing the information.

18. The apparatus of claim 16, wherein the redirecting means comprises first and second reflective means disposed on opposite sides of the medium and the medium is positioned in the same location as its location during the storage of information, the interrogating wave front having the same location or origin as the reference wave front utilized during the storage of the information and the undiffracted portion of the interrogating wave front after each interrogation of the medium following the same path as that of the noninterfering portion of the reference wave front used in storing the information.

19. A registration indicator, comprising a storage medium having a first image formed therein by the interference of a radiation wave front modulated with an information indicia and one portion of a reference wave front of radiation and having a second image formed therein by the interference of the same modulated wave front of radiation and another portion of the reference wave front having a direction of incidence for interference opposite to that of the one portion, means for directing an interrogating wave front of radiation at the storage medium along the same axis of incidence as the one portion of the reference wave front to generate a first image by the diffraction of radiation from the medium, the undiffracted radiation passing through the medium, and means for directing the undiffracted radiation back to the storage medium along the same axis of incidence as that of the other portion of the reference wave front to generate the second stored image for registration of the indicia of the first image with the indicia of the second image.

* * * * *